United States Patent [19]

Wright

[11] Patent Number: 4,907,010
[45] Date of Patent: Mar. 6, 1990

[54] DIRECTIONALLY SENSITIVE RECEIVING ANTENNA EMPLOYING GYROTROPIC MATERIAL

[76] Inventor: Thomas M. B. Wright, Glebe Cottage, 6 Hodwell, Ashwell, nr. Baldock, Hertfordshire SG7 5QG, United Kingdom

[21] Appl. No.: 3,470

[22] Filed: Jan. 15, 1987

Related U.S. Application Data

[63] Continuation-in-part of Ser. No. 706,389, Feb. 27, 1985, abandoned.

[30] Foreign Application Priority Data

Feb. 29, 1984 [GB] United Kingdom ............... 8405203

[51] Int. Cl.[4] ............................................ H01Q 19/09
[52] U.S. Cl. .................................................... 343/787
[58] Field of Search ............... 343/787, 788, 754, 813

[56] References Cited

U.S. PATENT DOCUMENTS

| 2,973,516 | 2/1961 | Medved | 343/787 |
| 3,246,332 | 4/1966 | Waldman et al. | 343/787 |
| 3,543,374 | 10/1970 | Johnson | 343/787 |
| 3,594,804 | 7/1971 | Hersch | 343/787 |
| 4,573,055 | 2/1986 | Wright | 343/787 |
| 4,588,994 | 5/1986 | Tang et al. | 343/787 |

OTHER PUBLICATIONS

Radiation from Ferrite-Filled Apertures, Angelakos et al., Proceedings of the IRE, vol. 44, No. 10, Oct. 1956.

Primary Examiner—Rolf Hille
Assistant Examiner—Doris J. Johnson
Attorney, Agent, or Firm—Cushman, Darby & Cushman

[57] ABSTRACT

Antenna apparatus has two laterally spaced waveguide horns with apertures covered by layers of gyrotropic ferrite material. The layers are angled to present opposite angles of incidence to radiation from a common distant source. Electromagnets produce magnetic fields in and parallel with the ferrite layers. The relative phase or amplitude of energy received on the horns is compared to indicate the direction of the source.

8 Claims, 4 Drawing Sheets

DIRECTIONALLY SENSITIVE RECEIVING ANTENNA EMPLOYING GYROTROPIC MATERIAL

BACKGROUND OF THE INVENTION

1. Field of the Invention

This invention relates to antenna apparatus and particularly to such apparatus using gyrotropic materials such as ferrites to provide improved directivity.

2. Prior Art

A gyrotropic medium is one whose properties are isotropic in the absence of a magnetic field, but which exhibits anisotropy, i.e. quantitative differences in measurements of the same properties along different crystal axes, when such a field is applied. This characteristic arises in ferrite materials as a consequence of the effect of the field on the electron spin component of the magnetic moment of the atomic lattice, and is the basis of the non-reciprocal properties which are extensively used in ferrite circulators and isolators and many other waveguide and microstrip circuit elements at microwave frequencies.

The continual decrease in size, and increase in power and sensitivity, of solid state transmitters and receivers in the microwave frequency now makes the relatively large size of the antenna structure required in many microwave systems an inconvenient anomaly. While devices using the well-established techniques of phased arrays and aperture synthesis may be utilised to reduce structure dimensions, a lower limit remains which is essentially determined by the wave length of the radiation and the dimensions of the radiating aperture.

U.S. Pat. No. 4,573,055 to Wright describes some proposed arrangements for harnessing the properties of gyrotropic materials to make useful antennas with high angular discrimination, but does not specify how the performance of existing antenna designs may be improved. In U.S. Pat. No. 4,573,055 segments of gyrotropic material are arranged in a shell around a conical magnetic pole piece which introduces a magnetic field which is generally perpendicular to the plane of the shell. Incident radiation is propagated in the segments of gyrotropic material to be extracted at the base of the cone.

U.S. Pat. No. 2,973,516 to Medved discloses a scanning antenna having a length of waveguide with an end closed by a wafer of ferrite material. An electromagnet assembly provides adjustable orthogonal magnetic fields in the plane of the ferrite wafer. Received signals are focussed on to the ferrite wafer by a Luneberg lens. Adjustment of the magnetic fields is said to deflect the antenna beam.

BRIEF SUMMARY OF THE INVENTION

According to this invention, the antenna apparatus has at least two spacially separate reception apertures for receiving electromagnetic radiation from a common distant source. There is at least one layer of gyrotropic material extending across each said aperture, the layers being arranged to present to radiation from the distant source angles of incidence which are of opposite sign. There are means for generating magnetic fields in and parallel with the layers of gyrotropic material, and means for comparing the relative phase and/or amplitude of energy from the common source received in the two apertures through said layers of gyrotropic material.

It can be shown that the transmission coefficient for electromagnetic energy through a gyrotropic material is highly dependent on the angle between the incident energy vector and the magnetic field direction in the material and the invention makes use of this characteristic. An angular deflection of the distant source in a direction normal to the plane of symmetry of the two layers of gyrotropic material produces equal and opposite changes in the angles of incidence with the two layers resulting in equal and opposite effects on the transmission coefficients through the layers.

In an embodiment, the antenna apparatus comprises a parabolic reflector which is symmetrical about two orthogonal axes, and means collecting electromagnetic energy focussed by the parabolic reflector, wherein said reception apertures are constituted by diametrically opposed elements of the aperture of the antenna such that the whole aperture of the antenna is covered by at least one layer of said gyrotropic material.

DETAILED DESCRIPTION OF THE PREFERRED EMBODIMENTS

Figure 1:
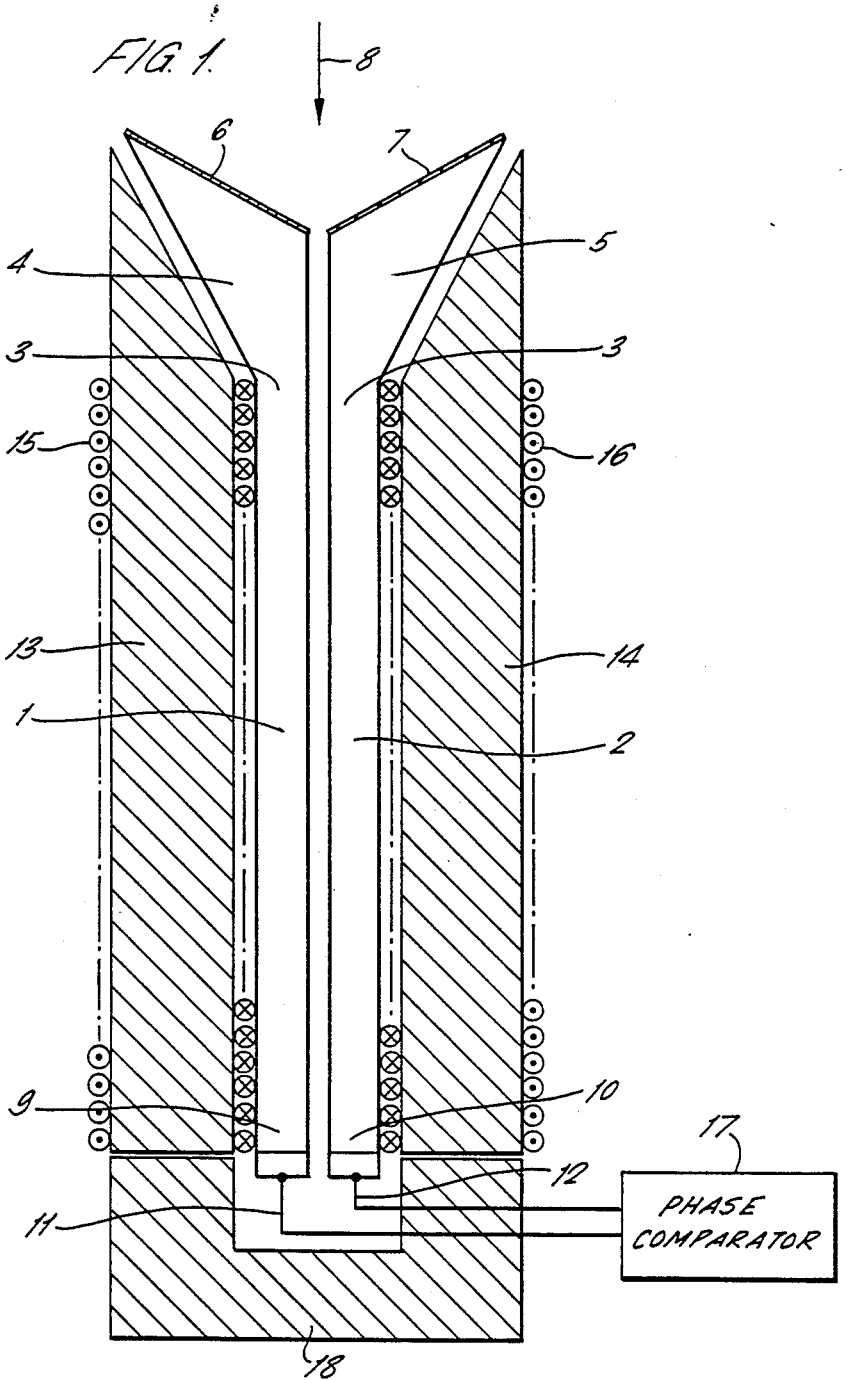
FIG. 1 is a cross sectional view of an embodiment of the invention employing a pair of spaced horn antennas.

Referring to FIG. 1, two sections of rectangular waveguide 1 and 2 are assembled in parallel with either the broad faces or narrow faces adjacent. The waveguide sections 1 and 2 are each terminated at corresponding adjacent ends 3 by waveguide horns 4 and 5 providing respective reception apertures, at the apertures of the horns, for receiving electromagnetic radiation from a common distant source. The apertures of the horns 4 and 5 are covered by thin slabs 6 and 7 of a gyrotropic ferrite material. The slabs 6 and 7 of ferrite material are arranged to be perpendicular to the common plane of the two sections of waveguide 1 and 2, but at equal and opposite angles to the plane of symmetry of the waveguide sections, so that the two slabs 6 and 7 present equal and opposite angles of incidence to radiation from a common distant source in the plane of symmetry, which arrives in a direction indicated by the arrow 8.

Instead of thin slabs of ferrite, the apertures of the horns 4 and 5 may be covered by films of ferrite supported on thin layers of low-loss dielectric material.

The other ends 9 and 10 of the waveguide sections 1 and 2 may be terminated by any convenient means permitting the extraction of power in the form of two separate outputs on lines 11 and 12. The waveguide sections 1 and 2 and the horns 4 and 5 may be filled with air or a dielectric.

On either side of the assembly of waveguides there are mounted magnets 13 and 14 which may be either permanent magnets or electromagnets constituted by cores of a suitable magnetisable material together with energising coils 15 and 16. If electromagnets are used, the strength of the magnetic field can be adjusted by an electromagnet possessing an adjustable drive. The polarity of the magnets 13 and 14 are arranged such that there are opposing North and South poles on either side of the apertures 4 and 5, so that the magnets establish a magnetic field across the apertures in the ferrite slabs or films 6 and 7.

It will be appreciated that, a plane wavefront of electromagnetic radiation from a distant common source, typically in the UHF or microwave frequency range, having a direction of incidence corresponding to the arrow 8, i.e. parallel to the axis of symmetry of the apparatus, will have equal angles of incidence on the two ferrite slabs or films 6 and 7, and accordingly will be received with equal phases and amplitudes on the output lines 11 and 12.

However, when the direction of the incident wavefront is deflected from the direction of the arrow 8, the phase and/or amplitude of the outputs on lines 11 and 12 will differ. It is the contribution of the present invention of these outputs with variation or deflection of the direction of incidence of electromagnetic radiation will be greater due to the presence of the magnetised ferrite slabs or films 6 and 7, than in their absence. This effect arises because of the gyrotropic effect of the ferrite material and the dependence of that gyrotropic effect on angle of incidence.

The outputs on lines 11 and 12 from the ends 9 and 10 of the waveguide sections 1 and 2 may be connected for example to any known phase comparator 17, or other device for comparing the relative phase and/or amplitude of the energy received in the two waveguide sections. For example, the waveguide sections may be connected directly to one of the well known waveguide hybrid coupling device, such as the magic-T or rat race. This arrangement then gives the described apparatus the features of a monopulse antenna response. However with the magnetised ferrite slabs or films 6 and 7, the sensitivity of the device to changes in direction of the incident radiation will, under appropriate conditions, be much greater than in an antenna apparatus of the same dimensions but without the ferrite layers.

Conveniently, an additional cross-piece 18 of magnetic material may be employed to complete the magnetic circuit between the two magnets 13 and 14 at the end remote from the ferrite slabs 6 and 7.

Figure 2:
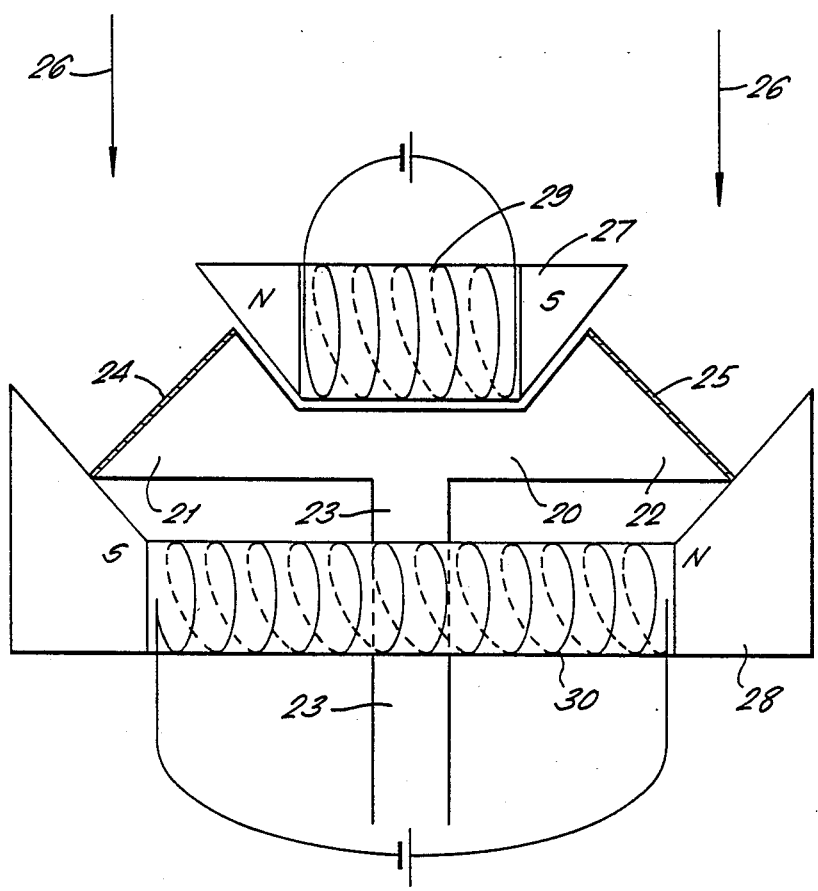
FIG. 2 is a schematic view of an alternative embodiment of the invention.

FIG. 2 illustrates an alternative arrangement of the embodiment described with reference to FIG. 1. In this embodiment, a waveguide cavity 20 is formed from a section of circular or rectangular waveguide at its midpoint to a waveguide output section 23. Uniform ferrite slabs 24 and 25 are provided extending across the apertures formed by the flared sections 21 and 22, so that the slabs present equal and opposite angles of incidence to radiation from a distant source arriving at the antenna apparatus in the direction of arrows 26.

Permanent or electromagnets 27 and 28 are again provided to generate magnetic fields in the thickness of the ferrite slabs 24 and 25 which extend across the apertures of the flared sections 21 and 22. Electromagnets may be energised by appropriate coils 29 and 30. The waveguide output section 23 may be bent relative to the plane of the paper in FIG. 2, so as to pass under the magnet 28.

By arranging the polarity of the magnets 27 and 28 with alternate North/South poles, a magnetic circuit is established incorporating the ferrite slabs 24 and 25.

Figure 3:
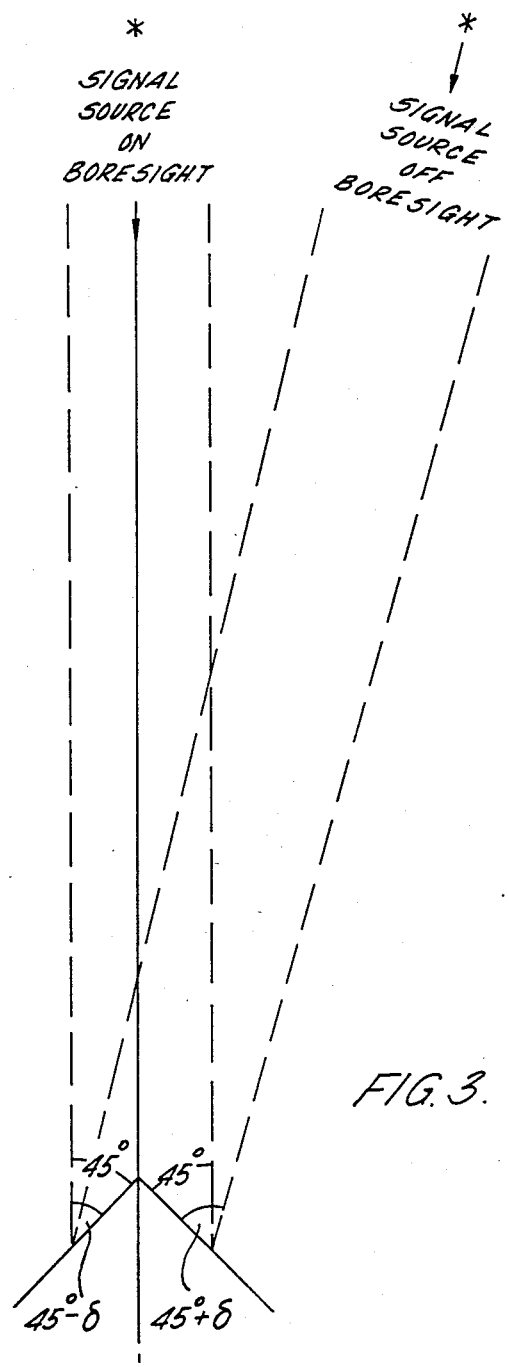
FIG. 3 is a schematic illustration of the operation of the embodiment of FIG. 2.

As explained previously, when a remote source of electromagnet radiation lies on the boresight of the apparatus as defined by the axis of symmetry in the plane of the paper which passes through the centre of the output waveguide section 23, the wavefront incident upon the apparatus makes equal angles with the ferrite slabs 24 and 25. This is illustrates schematically in FIG. 3 where the ferrite slabs are shown to present an angle of incidence of 45° to radiation from a remote source on the boresight. A displacement of the source off the boresight results in changes of incident angle of equal value but of opposite sign for the two ferrite slabs 24 and 25.

It is shown in U.S. Pat. No. 4,573,055 that within a magnetised ferrite sample a sensitivity coefficient may be defined as the partial derivative of the refractive index of the material, n, with respect to the angle $\theta$, between the incident electromagnetic radiation vector and the applied magnetic field according to the equation:

$$\Lambda^{\pm}_{\pi/4} =$$

$$\left(\frac{\partial n}{\partial \theta}\right)^{\pm}_{\pi/4} = \frac{nPQ\left[1 - 2\bar{\mu}_{\pm} \pm \frac{1}{P} \cdot \frac{(P^2 - 4)}{(P^2 + 8)^{\frac{1}{2}}}\right]}{\epsilon\left[P\left(P - \frac{3Q}{4}\right) \pm (P^2 + 8)^{\frac{1}{2}} \cdot \frac{Q}{4}\right]^{-1}}$$

Where $\bar{\mu}$, the permeability tensor is related to n by $n^2 = \epsilon\bar{\mu}$ $$P = \frac{\gamma H_o}{\omega} \text{ and } Q = \frac{4\pi\gamma M_o}{\omega}$$

$H_o$ is the constant external field
$M_o$ is the saturation magnetisation of the ferrite
$\gamma$ is the gyromagnetic ration
$\omega$ is the frequency of the signal
$f$ is the angle between the directions of $H_o$ and $\omega$
$\epsilon$ is the dielectric constant of the ferrite
$n_{\pm}$ are the refractive indices of the waves propagating in the ferrite medium Thus under those values of the parameters for which the sensitivity coefficient takes its sign from the quantity P and hence from the sign of the applied field vector, a change $\Delta$ in the energy output from the apparatus will be detected proportional to the displacement angle $\delta$ according to the equations:

$\Delta = \Delta_L + \Delta_R$ pos where $\Delta_L$ and $\Delta_R$ are the contributions arising from the left and right hand sides of the apparatus respectively, thus $$\Delta = \left(\frac{\partial n}{\partial \theta}\right) \cdot \delta + \left(\frac{-\partial n}{\partial \theta}\right) \cdot (-\delta) \text{ or}$$

$$\Delta = 2 \cdot \delta \cdot \left(\frac{\partial n}{\partial \theta}\right)$$

It can be seen therefore that the embodiments of FIGS. 1 and 2 provide simple means for detecting the position of a radiating source.

The two embodiments of the invention described hitherto enable the direction of an emitting source to be determined only in a single plane, i.e. the plane perpendicular to the plane of symmetry of the apparatus.

However, the principles of the present invention can be generalised to apply to an antenna providing directivity in two dimensions.

Figure 4:
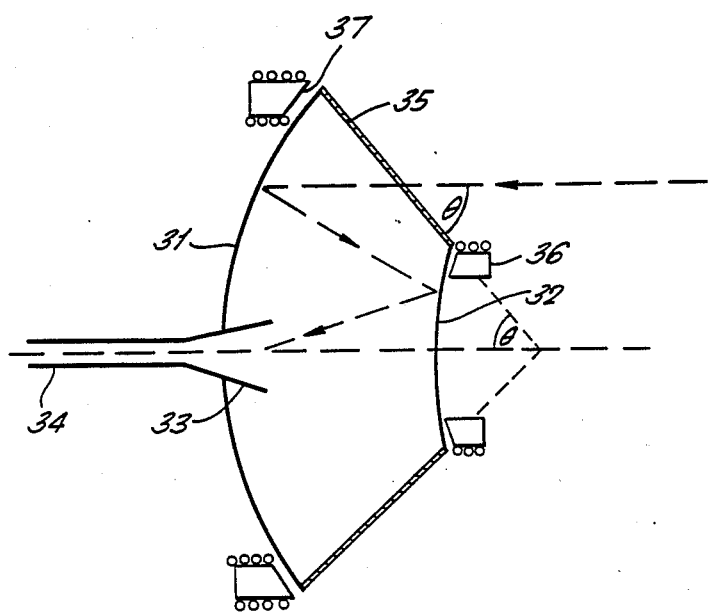
FIG. 4 is a schematic view of another embodiment of the invention employing a Cassegrain antenna.

FIG. 4 illustrates a Cassegrain antenna having a primary reflector 31 and a secondary convex reflector 32, directing energy received from a remote source on the boresight into a receiving horn 33 feeding a waveguide 34. This is the known basic structure of a Cassegrain antenna However, in the illustrated embodiment, the aperture of the antenna between the outer peripheral edge of the primary reflector 31 and the outer edge of the secondary reflector 32 is closed by a layer of gyrotropic ferrite material 35 formed as a truncated cone. Annular concentric magnetic pole pieces 36 and 37 are additionally provided as illustrated in FIG. 4, to generate a magnetic field extending outwardly in the surface of the ferrite cone 35 symmetrically about the boresight of the antenna.

It can thus be seen that diametrically opposed parts or elements of the aperture of the Cassegrain antenna, on opposite sides of the boresight, constitute spaced receiving apertures which are equivalent to those of the embodiments of FIGS. 1 and 2. The angle of incidence presented to electromagnetic radiation by the layer of ferrite material on one side of the boresight has opposite sign to the angle of incidence presented by the ferrite material on the diametrically opposed side of the boresight.

It will be appreciated that this embodiment of the invention may similarly be applied to other forms of antenna which incorporate a parabolic, or near parabolic reflector which is symmetrical about two orthogonal axis and which has means collecting electro-magnetic energy focussed by the parabolic reflector. For example an alternative form is the well known Gregorian antenna configuration in which the secondary reflector is concave.

What is claimed is:

1. Antenna apparatus for receiving electromagnetic radiation from a distant source comprising:
   at least two spacially separate reception apertures for receiving said electromagnetic radiation from said distant source;
   at least one layer of gyrotropic material extending across each of said apertures, said layers being arranged to present angles of incidence which are of opposite sign to radiation from said distant source;
   means for generating magnetic fields in and parallel with said layers of gyrotropic material; and
   means for comparing a relative phase or amplitude of energy from said distant source received in each of said two apertures through said layers of gyrotropic material.

2. The apparatus of claim 1 wherein said apertures are open ends of waveguides.

3. The apparatus of claim 2 wherein each of said apertures is a horn antennae fed from an end of each waveguide.

4. The apparatus of claim 1 wherein said means for generating magnetic fields includes magnetic pole pieces of opposite polarity located on opposite sides of the apertures.

5. The apparatus of claim 1 wherein said means for generating magnetic fields are electromagnet means which allow said magnetic fields in said layers of gyrotropic material to be adjustable in strength.

6. The apparatus of claim 1 wherein said at least one layer of gyrotropic material that extends across each aperture completely covers said aperture.

7. The apparatus of claim 1 wherein said layer of gyrotropic material completely covers said aperture.

8. An antenna apparatus for receiving electromagnetic radiation from a distant source comprising:
   a parabolic reflector having an aperture which is symmetrical about two orthogonal axes and focuses said electromagnetic energy;
   means for collecting said electromagnetic energy focused by said parabolic reflector;
   a layer of a gyrotropic material which covers said aperture and is arranged to present angles of incidence which are of opposite sign to radiation from said distant source which falls on diametrically opposite parts of said aperture;
   means for generating magnetic fields in and parallel with said layer of gyrotropic material; and
   a means for comparing a relative phase or amplitude of energy from said distant source received by diametrically opposite parts of said aperture.

* * * * *